(12) United States Patent
Kim et al.

(10) Patent No.: US 11,739,464 B2
(45) Date of Patent: Aug. 29, 2023

(54) WASHING MACHINE PROVIDING FITTED DEFAULT WASHING OPTIONS FOR USER USING LEARNING METHOD BASED ON ARTIFICIAL INTELLIGENCE AND A SYSTEM INCLUDING THE SAME

(71) Applicant: LG ELECTRONICS INC., Seoul (KR)

(72) Inventors: Sangwon Kim, Seoul (KR); Jaehoon Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 247 days.

(21) Appl. No.: 16/773,867

(22) Filed: Jan. 27, 2020

(65) Prior Publication Data

US 2021/0156068 A1 May 27, 2021

(30) Foreign Application Priority Data

Nov. 22, 2019 (KR) .......................... 10-2019-0151567

(51) Int. Cl.
| | | |
|---|---|---|
| *D06F 33/30* | (2020.01) | |
| *D06F 34/08* | (2020.01) | |
| *G05B 13/02* | (2006.01) | |
| *G05B 13/00* | (2006.01) | |
| *G06N 20/00* | (2019.01) | |
| *D06F 105/52* | (2020.01) | |
| *D06F 101/20* | (2020.01) | |
| *D06F 34/32* | (2020.01) | |
| *D06F 101/02* | (2020.01) | |

(52) U.S. Cl.
CPC .............. *D06F 34/32* (2020.02); *D06F 33/30* (2020.02); *D06F 34/08* (2020.02); *G05B 13/00* (2013.01); *G05B 13/0265* (2013.01); *G06N 20/00* (2019.01); *D06F 2101/02* (2020.02); *D06F 2101/20* (2020.02); *D06F 2105/52* (2020.02); *G05B 2219/2633* (2013.01)

(58) Field of Classification Search
CPC .......... D06F 33/30; D06F 33/32; D06F 34/08; D06F 2105/52
See application file for complete search history.

(56) References Cited

U.S. PATENT DOCUMENTS

2018/0305851 A1* 10/2018 Kwon ..................... D06F 34/05

* cited by examiner

*Primary Examiner* — Spencer E. Bell
(74) *Attorney, Agent, or Firm* — Lee, Hong, Degerman, Kang & Waimey PC

(57) ABSTRACT

An artificial intelligence apparatus determines whether a washing option in a washing course according to the input of a user is changed when input of the user is received, and collect use history information when the washing option is changed. In addition, the artificial intelligence apparatus inputs the collected use history information to an option resetting model to acquire a second washing option for resetting the washing course, and resets the washing option included in the washing course according to the second washing option.

8 Claims, 12 Drawing Sheets

FIG. 5

| | | SOIL LEVEL | | | TEMP | | | | Rinse | | | | | Internal-water spin | | | |
|---|---|---|---|---|---|---|---|---|---|---|---|---|---|---|---|---|---|
| Korean name | No | Light contamination | Normal contamination | Heavy contamination | Cold water | 20 | 30 | 40 | No rinsing | Standard rinsing | Addition of one-time rinsing | Addition of two-time rinsing | Stopping of drainage | Weak(600) | Middle(800) | Strong(1000) | Strongest(1200) |
| Standard washing | 1 | O | O | O | O | O | O | O | O | O | O | O | O | O | O | O | O |
| - | | | | O | O | O | O | O | O | O | O | O | O | O | O | O | O |
| Synthetic fiber | 2 | O | O | O | O | O | O | O | O | O | O | O | O | O | O | O | O |
| | 3 | O | O | O | O | O | O | O | O | O | O | O | O | O | O | O | O |
| Large-capacity frugal washing | 4 | O | O | O | O | O | O | O | O | O | O | O | O | O | O | O | O |

\<Washing option setting example\>
In case of setting standard washing course, default option setting is "normal contamination", "water temperature of 40°c", "standard rinsing", "strong dehydration"

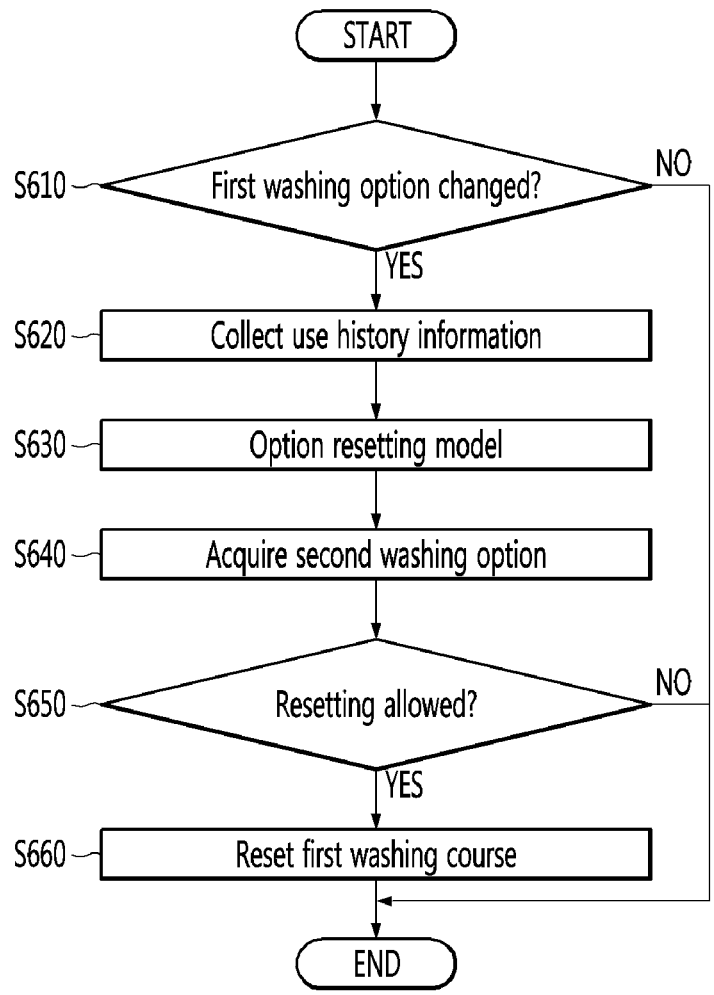

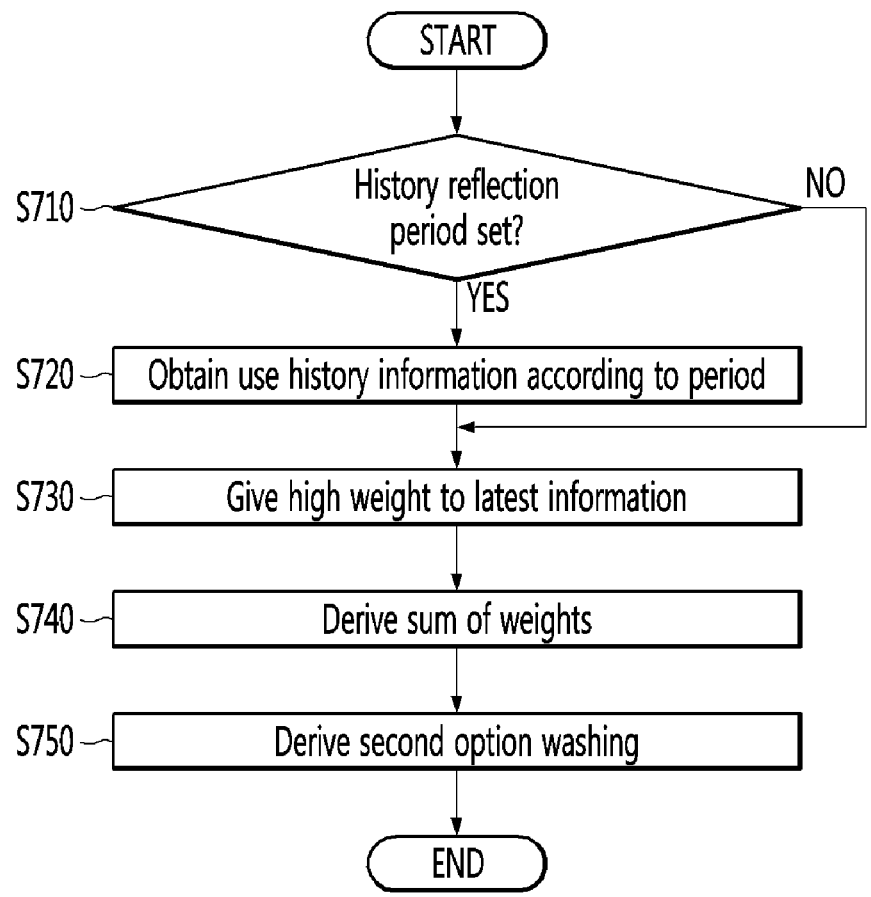

| Date | Washing course | Change option | Weight |
|---|---|---|---|
| 19. 11. 13 | Standard washing | Rinsing + 1 | 0.9 |
| 19. 11. 07 | Standard washing | Rinsing + 2 | 0.8 |
| 19. 11. 01 | Frugal washing | Dehydration + 1 | 0.7 |
| 19. 10. 10 | Standard washing | Rinsing + 1 | 0.6 |
| 19. 10. 01 | Standard washing | Rinsing + 1 | 0.5 |
| 19. 09. 20 | Frugal washing | Dehydration + 2 | 0.4 |

820 —

| Washing course | Change option | Sum of weights | Option resetting |
|---|---|---|---|
| Standard washing | Rinsing + 1 | 0.9+0.6+0.5 | Rinsing + 1 |
| Standard washing | Rinsing + 2 | 0.8 | |
| Frugal washing | Dehydration + 1 | 0.7 | Dehydration + 1 |
| Frugal washing | Dehydration + 2 | 0.4 | |

WASHING MACHINE PROVIDING FITTED DEFAULT WASHING OPTIONS FOR USER USING LEARNING METHOD BASED ON ARTIFICIAL INTELLIGENCE AND A SYSTEM INCLUDING THE SAME

CROSS-REFERENCE TO RELATED APPLICATIONS

Pursuant to 35 U.S.C. § 119(a), this application claims the benefit of earlier filing date and right of priority to Korean Patent Application No. 10-2019-0151567, filed on Nov. 22, 2019, the contents of which are all hereby incorporated by reference herein in its entirety.

BACKGROUND

The present disclosure relates to an artificial intelligence (AI) apparatus mounted in a washing machine to reset a washing course by reflecting a change history of a washing option of a user, and a method thereof.

Fundamentally, the washing option of a washing machine has courses set according to option information such as a washing strength, the number of times of rinsing, the number of times of dehydration, and a water temperature. The courses are preset according to various criteria such as the amount of laundry or the type of laundry. However, since the type of used laundry or a washing environment differs between homes, a user may frequently change a preset washing option.

An existing washing option may be set to a default option provided when a user selects each course. For example, when a "standard washing" course is set, a default option setting example may include "normal contamination", "water temperature of 40° C.", "standard rinsing", and "strong dehydration". Meanwhile, a user who wants to add rinsing to a washing option in the "standard rinsing" which is the default setting value according to personal preference or a washing environment needs to manually press a button "add two-time rinsing" every time.

SUMMARY

An object of the present disclosure is to provide an artificial intelligence apparatus for resetting a washing option of a washing course using user history information reflecting option change information, in order to solve inconvenience that a user needs to manually set a washing option every time.

According to the present disclosure, provided is an artificial intelligence apparatus for determining whether a washing option in a washing course is changed, inputting use history information reflecting change information of the washing option to an option resetting model, and resetting the washing option in the washing course according to a second washing option output by the option resetting model.

BRIEF DESCRIPTION OF THE DRAWINGS

FIG. 5 is a view illustrating a washing option example according to the present disclosure.

FIG. 6 is a flowchart according to the present disclosure.

FIG. 7 is a flowchart according to the present disclosure.

FIG. 8 is a view showing an option resetting model according to the present disclosure.

DETAILED DESCRIPTION OF THE EMBODIMENTS

Figure 1:
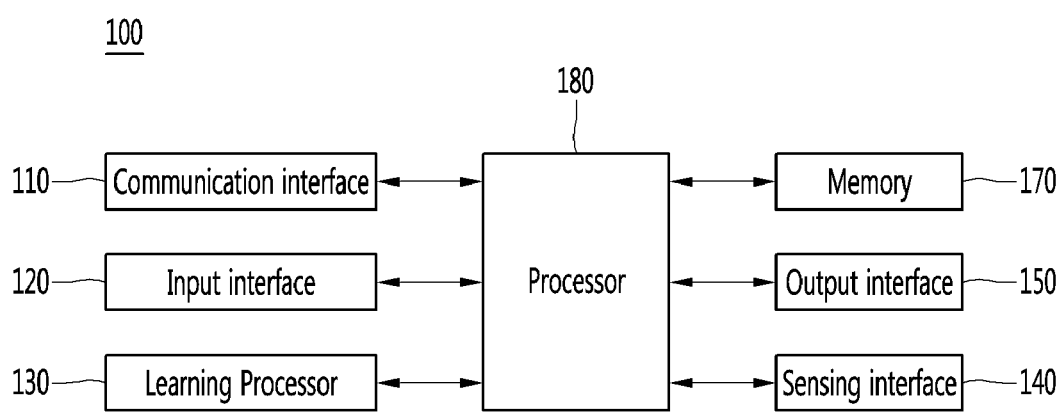
FIG. 1 is a block diagram illustrating an AI apparatus according to an embodiment of the present disclosure.

Hereinafter, embodiments of the present disclosure are described in more detail with reference to accompanying drawings and regardless of the drawings, symbols, same or similar components are assigned with the same reference numerals and thus overlapping descriptions for those are omitted. The suffixes "module" and "interface" for components used in the description below are assigned or mixed in consideration of easiness in writing the specification and do not have distinctive meanings or roles by themselves. In the following description, detailed descriptions of well-known functions or constructions will be omitted since they would obscure the disclosure in unnecessary detail. Additionally, the accompanying drawings are used to help easily understanding embodiments disclosed herein but the technical idea of the present disclosure is not limited thereto. It should be understood that all of variations, equivalents or substitutes contained in the concept and technical scope of the present disclosure are also included.

It will be understood that the terms "first" and "second" are used herein to describe various components but these components should not be limited by these terms. These terms are used only to distinguish one component from other components.

In this disclosure below, when one part (or element, device, etc.) is referred to as being 'connected' to another part (or element, device, etc.), it should be understood that the former can be 'directly connected' to the latter, or 'electrically connected' to the latter via an intervening part (or element, device, etc.). It will be further understood that when one component is referred to as being 'directly connected' or 'directly linked' to another component, it means that no intervening component is present.

<Artificial Intelligence (AI)>

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for training data is given, and the label may mean the correct answer (or result value) that the artificial neural network must infer when the training data is input to the artificial neural network. The unsupervised learning may refer to a method of learning an artificial neural network in a state in which a label for training data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

<Robot>

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving interface may include an actuator or a motor and may perform various physical operations such as moving a robot joint. In addition, a movable robot may include a wheel, a brake, a propeller, and the like in a driving interface, and may travel on the ground through the driving interface or fly in the air.

<Self-Driving>

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

Here, the self-driving vehicle may be regarded as a robot having a self-driving function.

<eXtended Reality (XR)>

Extended reality is collectively referred to as virtual reality (VR), augmented reality (AR), and mixed reality (MR). The VR technology provides a real-world object and background only as a CG image, the AR technology provides a virtual CG image on a real object image, and the MR technology is a computer graphic technology that mixes and combines virtual objects into the real world.

The MR technology is similar to the AR technology in that the real object and the virtual object are shown together. However, in the AR technology, the virtual object is used in the form that complements the real object, whereas in the MR technology, the virtual object and the real object are used in an equal manner.

The XR technology may be applied to a head-mount display (HMD), a head-up display (HUD), a mobile phone, a tablet PC, a laptop, a desktop, a TV, a digital signage, and the like. A device to which the XR technology is applied may be referred to as an XR device.

FIG. 1 is a block diagram illustrating an AI apparatus 100 according to an embodiment of the present disclosure.

Hereinafter, the AI apparatus 100 may be referred to as a terminal.

The AI apparatus (or an AI device) 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI apparatus 100 may include a communication interface 110, an input interface 120, a learning processor 130, a sensing interface 140, an output interface 150, a memory 170, and a processor 180.

The communication interface 110 may transmit and receive data to and from external devices such as other 100a to 100e and the AI server 200 by using wire/wireless communication technology. For example, the communication interface 110 may transmit and receive sensor information, a user input, a learning model, and a control signal to and from external devices.

The communication technology used by the communication interface 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input interface 120 may acquire various kinds of data.

Here, the input interface 120 may include a camera for inputting a video signal, a microphone for receiving an audio signal, and a user input interface for receiving information from a user. The camera or the microphone may be treated as a sensor, and the signal acquired from the camera or the microphone may be referred to as sensing data or sensor information.

The input interface 120 may acquire a training data for model learning and an input data to be used when an output is acquired by using learning model. The input interface 120 may acquire raw input data. Here, the processor 180 or the learning processor 130 may extract an input feature by preprocessing the input data.

The learning processor 130 may learn a model composed of an artificial neural network by using training data. The learned artificial neural network may be referred to as a learning model. The learning model may be used to an infer result value for new input data rather than training data, and the inferred value may be used as a basis for determination to perform a certain operation.

Here, the learning processor 130 may perform AI processing together with the learning processor 240 of the AI server 200.

Here, the learning processor 130 may include a memory integrated or implemented in the AI apparatus 100. Alternatively, the learning processor 130 may be implemented by using the memory 170, an external memory directly connected to the AI apparatus 100, or a memory held in an external device.

The sensing interface 140 may acquire at least one of internal information about the AI apparatus 100, ambient environment information about the AI apparatus 100, and user information by using various sensors.

Examples of the sensors included in the sensing interface 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output interface 150 may generate an output related to a visual sense, an auditory sense, or a haptic sense.

Here, the output interface 150 may include a display interface for outputting time information, a speaker for outputting auditory information, and a haptic module for outputting haptic information.

The memory 170 may store data that supports various functions of the AI apparatus 100. For example, the memory 170 may store input data acquired by the input interface 120, training data, a learning model, a learning history, and the like.

The processor 180 may determine at least one executable operation of the AI apparatus 100 based on information determined or generated by using a data analysis algorithm or a machine learning algorithm. The processor 180 may control the components of the AI apparatus 100 to execute the determined operation.

To this end, the processor 180 may request, search, receive, or utilize data of the learning processor 130 or the memory 170. The processor 180 may control the components of the AI apparatus 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI apparatus 100 so as to drive an application program stored in memory 170. Furthermore, the processor 180 may operate two or more of the components included in the AI apparatus 100 in combination so as to drive the application program.

Figure 2:
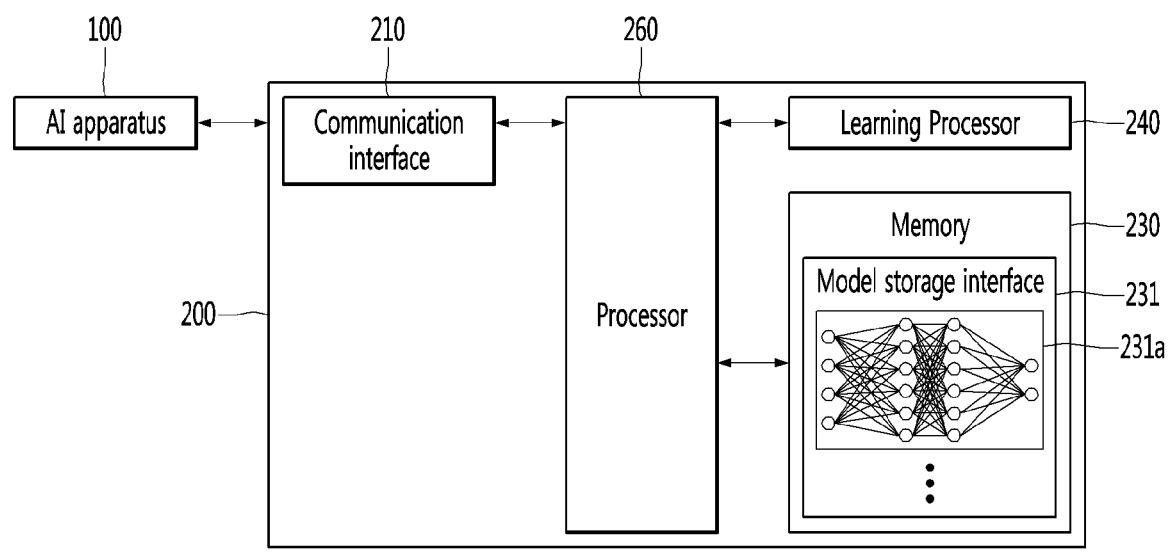
FIG. 2 is a block diagram illustrating an AI server according to an embodiment of the present disclosure.

FIG. 2 is a block diagram illustrating an AI server 200 according to an embodiment of the present disclosure.

Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. Here, the AI server 200 may be included as a partial configuration of the AI apparatus 100, and may perform at least part of the AI processing together.

The AI server 200 may include a communication interface 210, a memory 230, a learning processor 240, a processor 260, and the like.

The communication interface 210 can transmit and receive data to and from an external device such as the AI apparatus 100.

The memory 230 may include a model storage interface 231. The model storage interface 231 may store a learning or learned model (or an artificial neural network 231*a*) through the learning processor 240.

The learning processor 240 may learn the artificial neural network 231*a* by using the training data. The learning model may be used in a state of being mounted on the AI server 200 of the artificial neural network, or may be used in a state of being mounted on an external device such as the AI apparatus 100.

The learning model may be implemented in hardware, software, or a combination of hardware and software. If all or part of the learning models are implemented in software, one or more instructions that constitute the learning model may be stored in memory 230.

The processor 260 may infer the result value for new input data by using the learning model and may generate a response or a control command based on the inferred result value.

Figure 3:
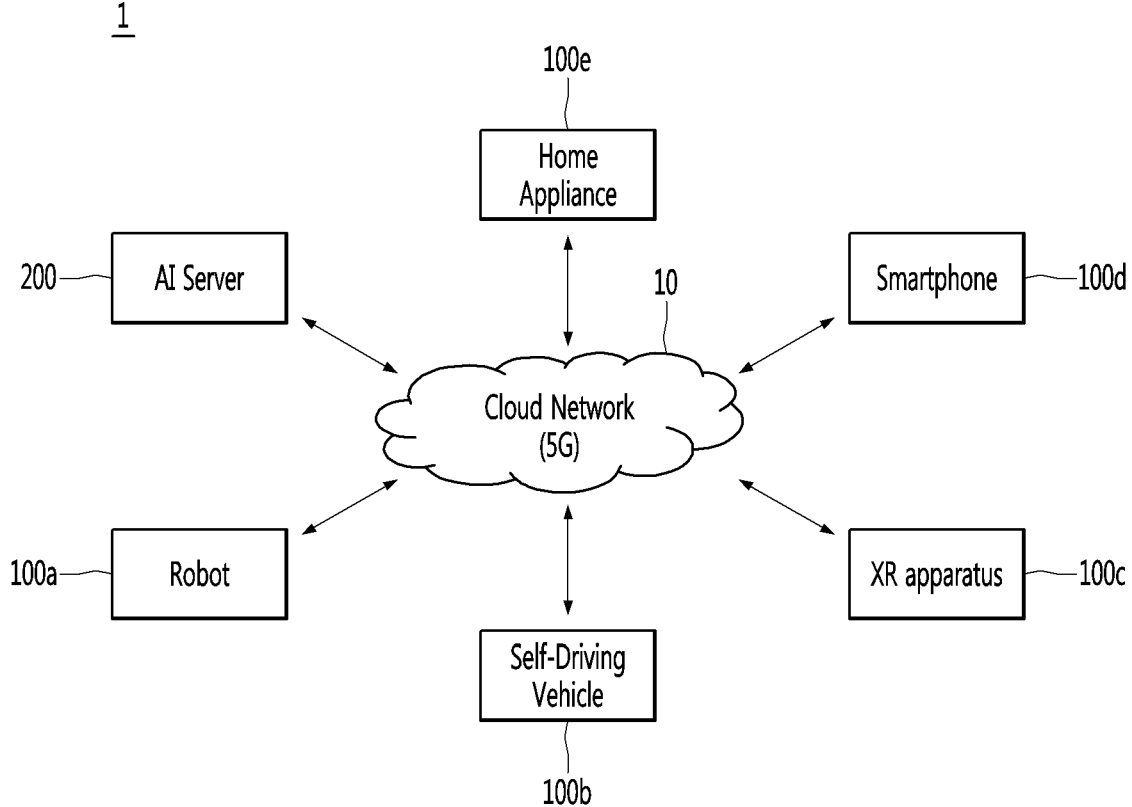
FIG. 3 is a view illustrating an AI system according to an embodiment of the present disclosure.

FIG. 3 is a view illustrating an AI system 1 according to an embodiment of the present disclosure.

Referring to FIG. 3, in the AI system 1, at least one of an AI server 200, a robot 100*a*, a self-driving vehicle 100*b*, an XR device 100*c*, a smartphone 100*d*, or a home appliance 100*e* is connected to a cloud network 10. The robot 100*a*, the self-driving vehicle 100*b*, the XR device 100*c*, the smartphone 100*d*, or the home appliance 100*e*, to which the AI technology is applied, may be referred to as AI apparatuses 100*a* to 100*e*.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100a to 100e and 200 configuring the AI system 1 may be connected to each other through the cloud network 10. In particular, each of the devices 100a to 100e and 200 may communicate with each other through a base station, but may directly communicate with each other without using a base station.

The AI server 200 may include a server that performs AI processing and a server that performs operations on big data.

The AI server 200 may be connected to at least one of the AI apparatuses constituting the AI system 1, that is, the robot 100a, the self-driving vehicle 100b, the XR device 100c, the smartphone 100d, or the home appliance 100e through the cloud network 10, and may assist at least part of AI processing of the connected AI apparatuses 100a to 100e.

Here, the AI server 200 may learn the artificial neural network according to the machine learning algorithm instead of the AI apparatuses 100a to 100e, and may directly store the learning model or transmit the learning model to the AI apparatuses 100a to 100e.

Here, the AI server 200 may receive input data from the AI apparatuses 100a to 100e, may infer the result value for the received input data by using the learning model, may generate a response or a control command based on the inferred result value, and may transmit the response or the control command to the AI apparatuses 100a to 100e.

Alternatively, the AI apparatuses 100a to 100e may infer the result value for the input data by directly using the learning model, and may generate the response or the control command based on the inference result.

Hereinafter, various embodiments of the AI apparatuses 100a to 100e to which the above-described technology is applied will be described. The AI apparatuses 100a to 100e illustrated in FIG. 3 may be regarded as a specific embodiment of the AI apparatus 100 illustrated in FIG. 1.

<AI+Robot>

The robot 100a, to which the AI technology is applied, may be implemented as a guide robot, a carrying robot, a cleaning robot, a wearable robot, an entertainment robot, a pet robot, an unmanned flying robot, or the like.

The robot 100a may include a robot control module for controlling the operation, and the robot control module may refer to a software module or a chip implementing the software module by hardware.

The robot 100a may acquire state information about the robot 100a by using sensor information acquired from various kinds of sensors, may detect (recognize) surrounding environment and objects, may generate map data, may determine the route and the travel plan, may determine the response to user interaction, or may determine the operation.

The robot 100a may use the sensor information acquired from at least one sensor among the lidar, the radar, and the camera so as to determine the travel route and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100a or may be learned from an external device such as the AI server 200.

Here, the robot 100a may perform the operation by generating the result by directly using the learning model, but the sensor information may be transmitted to the external device such as the AI server 200 and the generated result may be received to perform the operation.

The robot 100a may use at least one of the map data, the object information detected from the sensor information, or the object information acquired from the external device to determine the travel route and the travel plan, and may control the driving interface such that the robot 100a travels along the determined travel route and travel plan.

The map data may include object identification information about various objects arranged in the space in which the robot 100a moves. For example, the map data may include object identification information about fixed objects such as walls and doors and movable objects such as pollen and desks. The object identification information may include a name, a type, a distance, and a position.

In addition, the robot 100a may perform the operation or travel by controlling the driving interface based on the control/interaction of the user. Here, the robot 100a may acquire the intention information of the interaction due to the user's operation or speech utterance, and may determine the response based on the acquired intention information, and may perform the operation.

<AI+Self-Driving>

The self-driving vehicle 100b, to which the AI technology is applied, may be implemented as a mobile robot, a vehicle, an unmanned flying vehicle, or the like.

The self-driving vehicle 100b may include a self-driving control module for controlling a self-driving function, and the self-driving control module may refer to a software module or a chip implementing the software module by hardware. The self-driving control module may be included in the self-driving vehicle 100b as a component thereof, but may be implemented with separate hardware and connected to the outside of the self-driving vehicle 100b.

The self-driving vehicle 100b may acquire state information about the self-driving vehicle 100b by using sensor information acquired from various kinds of sensors, may detect (recognize) surrounding environment and objects, may generate map data, may determine the route and the travel plan, or may determine the operation.

Like the robot 100a, the self-driving vehicle 100b may use the sensor information acquired from at least one sensor among the lidar, the radar, and the camera so as to determine the travel route and the travel plan.

In particular, the self-driving vehicle 100b may recognize the environment or objects for an area covered by a field of view or an area over a certain distance by receiving the sensor information from external devices, or may receive directly recognized information from the external devices.

The self-driving vehicle 100b may perform the above-described operations by using the learning model composed of at least one artificial neural network. For example, the self-driving vehicle 100b may recognize the surrounding environment and the objects by using the learning model, and may determine the traveling route by using the recognized surrounding information or object information. The learning model may be learned directly from the self-driving vehicle 100a or may be learned from an external device such as the AI server 200.

Here, the self-driving vehicle 100b may perform the operation by generating the result by directly using the learning model, but the sensor information may be transmitted to the external device such as the AI server 200 and the generated result may be received to perform the operation.

The self-driving vehicle 100b may use at least one of the map data, the object information detected from the sensor information, or the object information acquired from the external device to determine the travel route and the travel plan, and may control the driving interface such that the self-driving vehicle 100b travels along the determined travel route and travel plan.

The map data may include object identification information about various objects arranged in the space (for example, road) in which the self-driving vehicle 100b travels. For example, the map data may include object identification information about fixed objects such as street lamps, rocks, and buildings and movable objects such as vehicles and pedestrians. The object identification information may include a name, a type, a distance, and a position.

In addition, the self-driving vehicle 100b may perform the operation or travel by controlling the driving interface based on the control/interaction of the user. Here, the self-driving vehicle 100b may acquire the intention information of the interaction due to the user's operation or speech utterance, and may determine the response based on the acquired intention information, and may perform the operation.

<AI+XR>

The XR device 100c, to which the AI technology is applied, may be implemented by a head-mount display (HMD), a head-up display (HUD) provided in the vehicle, a television, a mobile phone, a smartphone, a computer, a wearable device, a home appliance, a digital signage, a vehicle, a fixed robot, a mobile robot, or the like.

The XR device 100c may analyzes three-dimensional point cloud data or image data acquired from various sensors or the external devices, generate position data and attribute data for the three-dimensional points, acquire information about the surrounding space or the real object, and render to output the XR object to be output. For example, the XR device 100c may output an XR object including the additional information about the recognized object in correspondence to the recognized object.

The XR device 100c may perform the above-described operations by using the learning model composed of at least one artificial neural network. For example, the XR device 100c may recognize the real object from the three-dimensional point cloud data or the image data by using the learning model, and may provide information corresponding to the recognized real object. The learning model may be directly learned from the XR device 100c, or may be learned from the external device such as the AI server 200.

Here, the XR device 100c may perform the operation by generating the result by directly using the learning model, but the sensor information may be transmitted to the external device such as the AI server 200 and the generated result may be received to perform the operation.

<AI+Robot+Self-Driving>

The robot 100a, to which the AI technology and the self-driving technology are applied, may be implemented as a guide robot, a carrying robot, a cleaning robot, a wearable robot, an entertainment robot, a pet robot, an unmanned flying robot, or the like.

The robot 100a, to which the AI technology and the self-driving technology are applied, may refer to the robot itself having the self-driving function or the robot 100a interacting with the self-driving vehicle 100b.

The robot 100a having the self-driving function may collectively refer to a device that moves for itself along the given route without the user's control or moves for itself by determining the route by itself.

The robot 100a and the self-driving vehicle 100b having the self-driving function may use a common sensing method so as to determine at least one of the travel route or the travel plan. For example, the robot 100a and the self-driving vehicle 100b having the self-driving function may determine at least one of the travel route or the travel plan by using the information sensed through the lidar, the radar, and the camera.

The robot 100a that interacts with the self-driving vehicle 100b exists separately from the self-driving vehicle 100b and may perform operations interworking with the self-driving function of the self-driving vehicle 100b or interworking with the user who rides on the self-driving vehicle 100b.

Here, the robot 100a interacting with the self-driving vehicle 100b may control or assist the self-driving function of the self-driving vehicle 100b by acquiring sensor information on behalf of the self-driving vehicle 100b and providing the sensor information to the self-driving vehicle 100b, or by acquiring sensor information, generating environment information or object information, and providing the information to the self-driving vehicle 100b.

Alternatively, the robot 100a interacting with the self-driving vehicle 100b may monitor the user boarding the self-driving vehicle 100b, or may control the function of the self-driving vehicle 100b through the interaction with the user. For example, when it is determined that the driver is in a drowsy state, the robot 100a may activate the self-driving function of the self-driving vehicle 100b or assist the control of the driving interface of the self-driving vehicle 100b. The function of the self-driving vehicle 100b controlled by the robot 100a may include not only the self-driving function but also the function provided by the navigation system or the audio system provided in the self-driving vehicle 100b.

Alternatively, the robot 100a that interacts with the self-driving vehicle 100b may provide information or assist the function to the self-driving vehicle 100b outside the self-driving vehicle 100b. For example, the robot 100a may provide traffic information including signal information and the like, such as a smart signal, to the self-driving vehicle 100b, and automatically connect an electric charger to a charging port by interacting with the self-driving vehicle 100b like an automatic electric charger of an electric vehicle.

<AI+Robot+XR>

The robot 100a, to which the AI technology and the XR technology are applied, may be implemented as a guide robot, a carrying robot, a cleaning robot, a wearable robot, an entertainment robot, a pet robot, an unmanned flying robot, a drone, or the like.

The robot 100a, to which the XR technology is applied, may refer to a robot that is subjected to control/interaction in an XR image. In this case, the robot 100a may be separated from the XR device 100c and interwork with each other.

When the robot 100a, which is subjected to control/interaction in the XR image, may acquire the sensor information from the sensors including the camera, the robot 100a or the XR device 100c may generate the XR image based on the sensor information, and the XR device 100c may output the generated XR image. The robot 100a may operate based on the control signal input through the XR device 100c or the user's interaction.

For example, the user can confirm the XR image corresponding to the time point of the robot 100a interworking remotely through the external device such as the XR device 100c, adjust the self-driving travel path of the robot 100a through interaction, control the operation or driving, or confirm the information about the surrounding object.

<AI+Self-Driving+XR>

The self-driving vehicle 100b, to which the AI technology and the XR technology are applied, may be implemented as a mobile robot, a vehicle, an unmanned flying vehicle, or the like.

The self-driving driving vehicle 100b, to which the XR technology is applied, may refer to a self-driving vehicle having a means for providing an XR image or a self-driving vehicle that is subjected to control/interaction in an XR image. Particularly, the self-driving vehicle 100b that is subjected to control/interaction in the XR image may be distinguished from the XR device 100c and interwork with each other.

The self-driving vehicle 100b having the means for providing the XR image may acquire the sensor information from the sensors including the camera and output the generated XR image based on the acquired sensor information. For example, the self-driving vehicle 100b may include an HUD to output an XR image, thereby providing a passenger with a real object or an XR object corresponding to an object in the screen.

Here, when the XR object is output to the HUD, at least part of the XR object may be outputted so as to overlap the actual object to which the passenger's gaze is directed. Meanwhile, when the XR object is output to the display provided in the self-driving vehicle 100b, at least part of the XR object may be output so as to overlap the object in the screen. For example, the self-driving vehicle 100b may output XR objects corresponding to objects such as a lane, another vehicle, a traffic light, a traffic sign, a two-wheeled vehicle, a pedestrian, a building, and the like.

When the self-driving vehicle 100b, which is subjected to control/interaction in the XR image, may acquire the sensor information from the sensors including the camera, the self-driving vehicle 100b or the XR device 100c may generate the XR image based on the sensor information, and the XR device 100c may output the generated XR image. The self-driving vehicle 100b may operate based on the control signal input through the external device such as the XR device 100c or the user's interaction.

Figure 4:
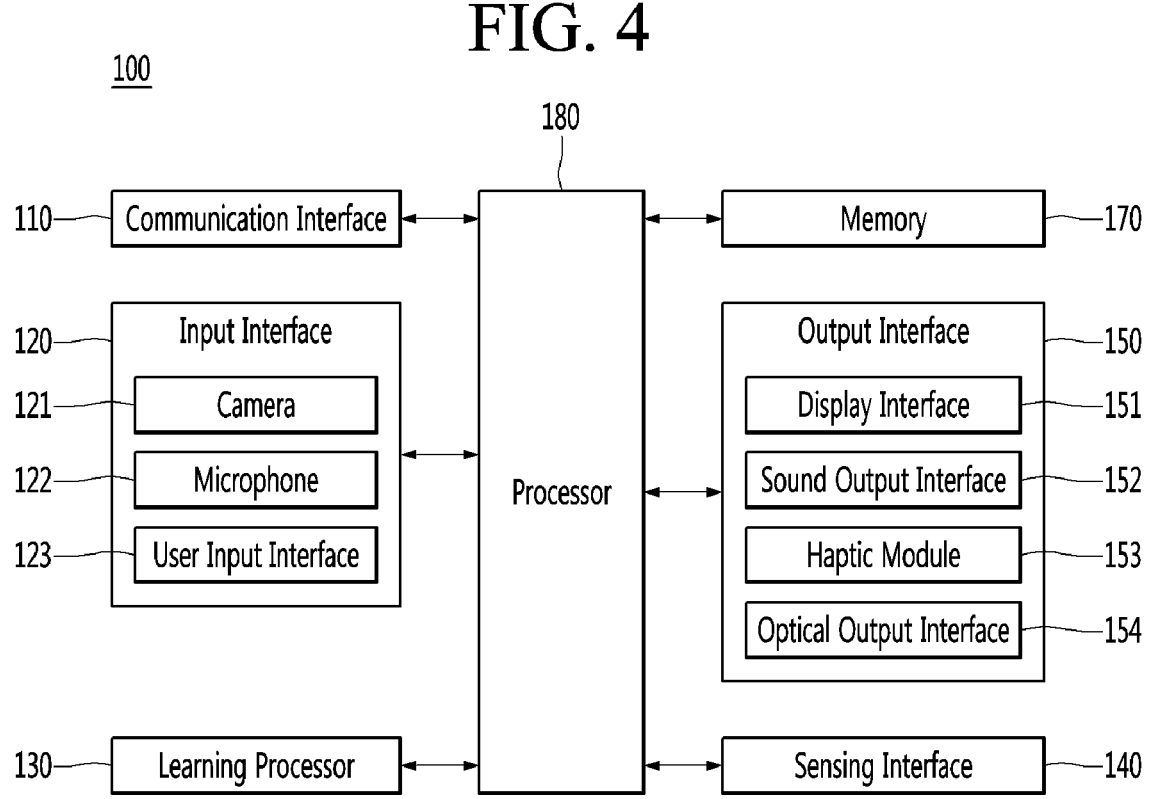
FIG. 4 is a block diagram illustrating an AI apparatus according to an embodiment of the present disclosure.

FIG. 4 is a block diagram illustrating an AI apparatus 100 according to an embodiment of the present disclosure.

The redundant repeat of FIG. 1 will be omitted below.

In the present disclosure, the AI apparatus 100 may include an edge device.

The communication interface 110 may also be referred to as a communicator.

Referring to FIG. 4, the input interface 120 may include a camera 121 for image signal input, a microphone 122 for receiving audio signal input, and a user input interface 123 for receiving information from a user.

Voice data or image data collected by the input interface 120 are analyzed and processed as a user's control command.

Then, the input interface 120 is used for inputting image information (or signal), audio information (or signal), data, or information inputted from a user and the AI apparatus 100 may include at least one camera 121 in order for inputting image information.

The camera 121 processes image frames such as a still image or a video obtained by an image sensor in a video call mode or a capturing mode. The processed image frame may be displayed on the display interface 151 or stored in the memory 170.

The microphone 122 processes external sound signals as electrical voice data. The processed voice data may be utilized variously according to a function (or an application program being executed) being performed in the AI apparatus 100. Moreover, various noise canceling algorithms for removing noise occurring during the reception of external sound signals may be implemented in the microphone 122.

The user input interface 123 is to receive information from a user and when information is inputted through the user input interface 123, the processor 180 may control an operation of the AI apparatus 100 to correspond to the inputted information.

The user input interface 123 may include a mechanical input means (or a mechanical key, for example, a button, a dome switch, a jog wheel, and a jog switch at the front, back or side of the AI apparatus 100) and a touch type input means. As one example, a touch type input means may include a virtual key, a soft key, or a visual key, which is displayed on a touch screen through software processing or may include a touch key disposed at a portion other than the touch screen.

The sensing interface 140 may also be referred to as a sensor interface.

The output interface 150 may include at least one of a display interface 151, a sound output module 152, a haptic module 153, or an optical output module 154.

The display interface 151 may display (output) information processed in the AI apparatus 100. For example, the display interface 151 may display execution screen information of an application program running on the AI apparatus 100 or user interface (UI) and graphic user interface (GUI) information according to such execution screen information.

The display interface 151 may be formed with a mutual layer structure with a touch sensor or formed integrally, so that a touch screen may be implemented. Such a touch screen may serve as the user input interface 123 providing an input interface between the AI apparatus 100 and a user, and an output interface between the AI apparatus 100 and a user at the same time.

The sound output module 152 may output audio data received from the wireless communication interface 110 or stored in the memory 170 in a call signal reception or call mode, a recording mode, a voice recognition mode, or a broadcast reception mode.

The sound output module 152 may include a receiver, a speaker, and a buzzer.

The haptic module 153 generates various haptic effects that a user can feel. A representative example of a haptic effect that the haptic module 153 generates is vibration.

The optical output module 154 outputs a signal for notifying event occurrence by using light of a light source of the AI apparatus 100. An example of an event occurring in the AI apparatus 100 includes message reception, call signal reception, missed calls, alarm, schedule notification, e-mail reception, and information reception through an application.

In the artificial intelligence apparatus mounted in the washing machine of the present disclosure, the artificial intelligence apparatus may control the washing machine to perform operation of the washing machine.

In addition, there may be various washing courses and washing options in the washing machine. At this time, the washing course may mean course information in which washing option information is combined according to the washing method, and may be used interchangeably with a washing mode. Examples thereof may include a "standard course", a "functional clothing course", a "cold water washing course", a "wool washing course" and a "speed washing course".

In addition, the washing option may mean operation information configuring the washing course. For example, the washing option may include a water temperature, the number of times of rinsing (otherwise referred to as "rinse cycles"), the number of times of dehydration and a washing strength (otherwise referred to as "drying cycles"). In an actual use example, a user may select a washing course after pressing a power button. In addition, the user may change or add a washing option according to preference.

Hereinafter, the present disclosure will be described.

FIG. 5 is a view illustrating a washing option example according to the present disclosure.

FIG. 5 shows an example of washing options according to washing courses. Referring to FIG. 5, each washing course and washing options configuring each washing course are shown. The washing course is divided into a standard course, a heavy course, a synthetic fiber, a large-capacity frugal washing course, a stain removal and blended fabric washing and includes a combination of operations of various washing options.

At this time, the washing options may include a degree of contamination, a water temperature, the number of times of rinsing, an internal-water spin strength, a dry spin strength, a drying time, wash and other options.

The washing course and the washing option may be differently set according to the living conditions and the washing conditions in each country and are not limited to the description of FIG. 5. For example, in the case of the "standard washing course" 510, the basic washing option information may include "normal contamination", "water temperature of 40° C.", "standard rinsing" and "strong dehydration". Hereinafter, operation of the present disclosure will be described with reference to FIG. 6.

FIG. 6 is a flowchart according to the present disclosure.

Referring to FIG. 6, a user may set a washing course after turning on the washing machine. User input may be received via the input unit 120 of the artificial intelligence apparatus 100. At this time, the input unit 120 may receive user input via a microphone for receiving a speech signal or via button operation of the user.

When the user sets a first washing course, the processor 180 may acquire a first washing option corresponding to the selected first washing course. When the user changes the first washing option according to user preference, the processor 180 may determine whether the first washing option in the first washing course according to user input is changed (S610).

At this time, the washing option may include driving options of the washing machine, such as a water temperature, the number of times of rinsing, the number of times of dehydration and a washing strength. In addition, the change of the washing option may include adding, decreasing or changing washing option information configuring the washing course.

Upon determining that the user has changed the first washing option, the processor 180 according to the present disclosure may collect use history information reflecting the change information of the first washing option (S520). At this time, the use history information may include information on a washing course used by a user and washing option information included in the washing course. In addition, the use history information may include information on the case where the user uses the washing course without changing the option. The use history information may be stored in the memory of the artificial intelligence apparatus.

For example, assume that the user wants to add one-time rinsing as a previous result of washing the laundry using the "standard washing course".

The processor 180 may acquire the first washing option information related to the standard washing course, when the user sets the first washing option to the "standard washing course". At this time, the first washing option information included in the standard washing course may include "water temperature of 40° C., two-time rinsing, two-time dehydration, and middle washing strength".

When the user adds one-time rinsing, the processor 180 may determine that one-time rinsing is added to the first washing option in the "standard washing course" according to user input (S610). Thereafter, when washing is performed, the processor 180 may acquire change information of the first washing option indicating that one-time rinsing is added in the standard washing course and collect use history information reflecting the same. In addition, the use history information may be stored in the memory 170.

According to the present disclosure, the processor 180 may input the collected use history information to an option resetting model (S630). In addition, the processor 180 may acquire a second washing option which is a result value output by the option resetting model (S640) and reset the first washing course according to the acquired second washing option (S660).

At this time, the option resetting model may include a statistical model for deriving a second washing option with a sum of weights given to the washing option. In addition, the option resetting model may include an artificial intelligence model implemented by an algorithm.

Next, a process of determining whether resetting is allowed in S650 will be described.

According to the present disclosure, the processor 180 may ask the user whether the first washing option of the preset first washing course is set to the second washing option (S650), after the collected use history information is input to the option resetting model and the second washing option output by the option resetting model is acquired.

Specifically, the processor 180 may control the output unit 150 to output a notification related to whether resetting of the first washing course is allowed and information on the second washing option, before the first washing course is reset. When input of allowing the first washing option is received from the user, the processor 180 may reset the first washing course to the second washing option (S660).

Thereafter, when user input for operation of the washing machine is received, the processor 180 may control the washing machine to the reset first washing course.

In another example, the processor 180 may reset the first washing course according to the second washing option, and control the output unit 150 to output a resetting notification when the first washing course is reset according to the second washing option.

Thereafter, when user input for operation of the washing machine is received, the processor 180 may control the washing machine to perform the reset first washing course.

Meanwhile, even if the processor 180 determines that the first washing course is changed according to the second washing option using the use history information of the user, when the user does not know the resetting of the washing course, the user may further set the washing option according to the previous usage habit thereof in spite of resetting of the first washing course.

Accordingly, in order to prevent this, the processor 180 may control the output unit 150 to output a notification for asking the user whether resetting is allowed, before the first washing course is reset according to the second washing option.

For example, the processor 180 may acquire the second washing option in which "one-time rinsing" is added in the "standard washing course", as a result of inputting the collected use history information to the option resetting model. Thereafter, the processor 180 may control the output unit 150 to output a notification related to whether resetting of the first washing course is allowed and information on the second washing option. At this time, whether resetting is allowed may be determined, by outputting a notification "One-time rinsing is added to the standard washing course option. If you agree, please press YES" via the output unit 150 of the artificial intelligence apparatus 100 and enabling the user to give an answer when the artificial intelligence apparatus 100 outputs a speech related to resetting using a speech recognition function.

When input of allowing resetting of the standard washing course is received from the user, the processor 180 may reset the washing option of the "standard washing course" according to the acquired second washing option ("addition of one-time rinsing in the standard washing course") (S660). Thereafter, when user input for operation of the washing machine is received, the processor may control the washing machine to perform the reset standard washing course. At this time, the washing option included in the standard washing course may be reset to "water of 40° C., three-time rinsing, two-time dehydration and middle washing strength".

In another example, the processor 180 according to the present disclosure may reset the standard washing course without S650, and control the output unit 150 to output resetting of the standard washing course according to the second washing option after the standard washing course is reset. At this time, the washing option included in the standard washing course may be reset to "water of 40° C., three-time rinsing, two-time dehydration and middle washing strength".

The example of the output unit 150 according to S650 will be described with reference to FIG. 11.

Hereinafter, the learning method of the option resetting model for deriving the second washing option will be described in detail with reference to FIG. 7.

FIG. 7 is a flowchart according to the present disclosure.

Referring to FIG. 7, the processor 180 according to the present disclosure may determine whether the first washing option in the first washing course according to the user input is changed and acquire use history information reflecting change information of the first washing option when the first washing option is changed. The processor 180 may input the acquired use history information to the option resetting model to acquire the second washing option.

The option resetting model according to the present disclosure may give a weight to each of a plurality of washing options in the first washing course included in the use history information (S730).

Specifically, the option resetting model may output a second washing option suitable for the user preference using a statistical model obtained by analyzing the collected use history information using a statistical method. The processor 180 may collect the use history information by storing a washing option change history among the plurality of washing courses. The collected use history information may include a plurality of washing courses and a plurality of washing options corresponding to the plurality of washing courses.

The option resetting model according to the present disclosure may give a weight to each of the plurality of washing options corresponding to the plurality of washing courses included in the use history information. At this time, the more recent the washing option is collected in chronological order, the higher the weight given to each of the plurality of washing options is.

In another disclosure, the option resetting model may classify the plurality of washing courses into the same washing course and give the weight to each of the plurality of washing options included in the classified same washing course. At this time, the more recent the use history is collected in chronological order, the higher the weight given to each of the plurality of washing options is.

After the weight is given to each of the plurality of washing options, the option resetting model may output, as the second washing option, a washing option, in which a sum of the weights is maximum, among the plurality of washing options (S740 and S750).

Specifically, the option resetting model may sum weights given to the same washing option corresponding to the first washing course among the weights respectively given to the plurality of washing options included in the use history information and derive a washing option, in which the sum is maximum, as the second washing option of the first washing course. Thereafter, the option resetting model may reset the first washing course using the derived second washing option.

In addition, the option resetting model may sum weights having the same washing option while having the same washing course among the weights given to the washing options, the weights given to the washing options are corresponding to each of the plurality of washing option in washing courses included in the use history information Thereafter, the washing option of which the sum is maximum may be derived as the second washing option of each of the plurality of washing courses.

Thereafter, the option resetting model may reset the plurality of washing courses using the derived second washing option.

In addition, according to the present disclosure, the option resetting model may not have all the use history information of the user and reflect the recent user preference in resetting of the washing course using only the use history information recently used by the user.

Specifically, the option resetting model may determine whether a use history information reflection period is previously set (S710). When the use history information reflection period is previously set, the option resetting model may acquire use history information according to the period (S720).

More specifically, when the use history information reflection period is set, the option resetting model may extract use history information before a certain period from most recently acquired use history information. In addition, the option resetting model may give weights to the plurality of options in the first washing course included in the extracted use history information and derive, as the second washing option, a washing option, in which the sum of the weights is maximum, among the plurality of washing options. At this time, the more recent the use history is collected, the higher the weight given to each of the plurality of washing options is. The detailed example of the option resetting model will be described with reference to FIGS. 8 and 9.

Meanwhile, the option resetting model may include a separate hardware model included in the processor, without being limited thereto. In addition, the option resetting model is simply an expression for specifying a part of a process of deriving the second washing option at the processor and may perform operation of the option resetting model at the processor. The option resetting model may not be implemented as a hardware model.

In another example, the option resetting model according to the present disclosure may include an artificial intelligence model.

Specifically, the processor 180 may determine whether the first washing option in the first washing course is changed, input use history information reflecting the change information of the first washing option to the artificial intelligence model when the first washing option is changed, and reset the first washing option according to the second washing option output by the artificial intelligence model.

At this time, the artificial intelligence model may include an artificial neural network model having a problem-solving ability which is composed of artificial neurons (nodes) that form a network by synaptic connections. In addition, a model for deriving a result by previously learned data when a specific value is input may be included. Learning of the artificial intelligence model will be described in detail with reference to FIG. 9. First, FIG. 8 will be described.

FIG. 8 is a view showing an option resetting model according to the present disclosure.

FIG. 8 shows an example of performing operation of a statistical model among the option resetting models of S630 according to the present disclosure.

Referring to FIG. 8, when a washing option in the washing course is changed, the processor 180 may store a change option corresponding to the washing course in use history information 810. For example, assume that a user used a standard washing and frugal washing course from September to November, stored cases where an option is changed for each course in the use history information, and obtained information 810.

The option resetting model according to the present disclosure may give a weight to each of "rinsing+1" and "rinsing+2" which are the plurality of washing options in the standard washing course included in the use history information 810. In addition, a weight may be given to each of "dehydration+1" and "dehydration+2" which are the plurality of washing options in the frugal washing course included in the use history information 810.

At this time, the more recent the washing option is collected, the higher the weight given to each of the plurality of washing options is. Referring to FIG. 8, a weight of 0.9 may be given to the use history information "addition of one-time rinsing in the standard washing course" acquired on November 13. In addition, a weight of 0.4 may be given to the use history information "addition of two-time dehydration in the frugal washing course" acquired on September 20.

Meanwhile, as shown in FIG. 8, the weight is merely an example and the present disclosure is not limited to sequentially giving the weight starting from the recently collected washing option. In addition, the weight may be independently given to each washing course information.

According to the present disclosure, the option resetting model may output, as the second washing option, a washing option, in which a sum of the weights is maximum, among the plurality of washing options.

For example, a result of deriving the sum of the weights of each of the washing options included in the same washing course using the weights given in the use history information 810 is shown as 820. The sum of the weights when "one-time rinsing is added in the standard washing course" is 0.9+0.6+0.5, and the sum of the weights when "two-time rinsing is added in the standard washing course" is 0.8.

The option resetting model according to the present disclosure may output addition of one-time rinsing having the larger sum between addition of one-time rinsing and addition of two-time rinsing corresponding to the plurality of washing options in the standard washing course.

In another example, when one-time dehydration is added in the frugal washing course, the sum of the weights is 0.7 and, when two-time dehydration is added in the frugal washing course, the sum of the weights is 0.4.

The option resetting model according to the present disclosure may output, as the second washing option, addition of one-time dehydration which is the washing option having the larger sum between addition of one-time dehydration and addition of two-time dehydration corresponding to the plurality of washing options in the frugal washing course.

As in the above-described examples, the option resetting model may independently acquire the second washing option with respect to each of the plurality of washing courses using the user history information.

Meanwhile, operation of the option resetting model may be performed by the processor 180 and the option resetting model is not limited to the hardware model.

According to the present disclosure, the option resetting model may extract use history information before a certain period from the most recently acquired use history information, when a use history information reflection time is set.

For example, when the use history information reflection period is set to one month, the option resetting model may extract use history information, in which the washing option has been changed during the past one month, from the collected use history information 810. That is, the use history information from November 13 to October 13 may be extracted.

Thereafter, the option resetting model may give weights to the plurality of options in the first washing course included in the extracted use history information and output, as the second washing option, a washing option, in which the sum of the weight is maximum, among the plurality of washing options.

For example, the option resetting model may extract the use history information on November 13, November 7, and November 1, which is the use history information until October 13. Thereafter, weights may be given to the frugal washing course options and the plurality of options in the standard washing course included in the use history information.

The option resetting model according to the present disclosure may output, as the second washing option, addition of one-time rinsing which is the washing option having the larger sum of weights between addition of one-time rinsing (e.g., a weight of 0.9) and addition of two-time rinsing (e.g., a weight of 0.8) corresponding to the plurality of washing options in the standard washing course.

In another example, since the sum of weights is 0.7 when one-time dehydration is added in the frugal washing course, the option resetting model may output, as the second washing option, addition of one-time dehydration.

Figure 9:
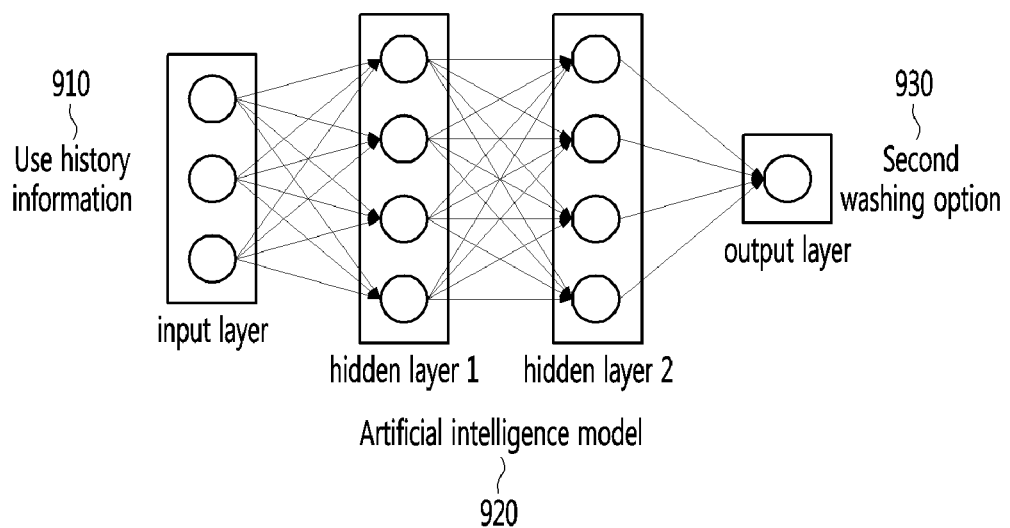
FIG. 9 is a view showing an option resetting model according to the present disclosure.

FIG. 9 is a view showing an option resetting model according to the present disclosure.

FIG. 9 shows a configuration example of an artificial intelligence model 920 among the option resetting models of S630 according to the present disclosure.

According to the present disclosure, when the washing option in the washing course is changed, the processor 180 may store a change option corresponding to the washing course in the use history information.

The artificial intelligence model 920 according to FIG. 9 may include an artificial intelligence model 920 trained to output the second washing option as a result value 930 when the use history information given with the weight is used as an input value 910.

Specifically, the processor 180 may be trained such that the artificial intelligence model 920 outputs the second washing option according to the user preference, by giving a higher weight to a recently collected history in the use history information.

The artificial intelligence model 920 may include supervised learning, unsupervised learning, and reinforcement learning according to the learning method.

Supervised learning means a method of training an artificial neural network in a state in which a label for training data is given, and a label means a correct answer (or a result value) inferred by the artificial neural network when training data is input to the artificial neural network.

The artificial intelligence model 920 according to the present disclosure may be trained by labeling the second washing option suitable for the user preference as the result value 930 when the use history information is input as the input value 910.

Specifically, the processor 180 may collect the use history information according to "course selection information" and "option setting change" occurs whenever the user uses the washing machine. The processor 180 may set the collected use history information as the input value 910 of the artificial intelligence model 920. In addition, the processor 180 may extract the use history information before a certain period from most recently acquired use history information and set the extracted use history information as the input value 910 of the artificial intelligence model 920.

In addition, the processor 180 may give a higher weight to the recently collected washing option included in the use history information and set the recently collected washing option as the input value 910 of the artificial intelligence model 920.

At this time, in the method of giving a weight to the input value 910, the processor 180 may extract the use history information before the certain period from the recently acquired use history information and give a weight to a washing option at a point in time close to a latest point in time.

In addition, when the preset history reflection period is set, the processor 180 may extract the use history information before the certain period from the recently acquired use history information in a set period and give a weight to the washing option at a point in time close to the latest point in time.

For example, when the history reflection period is set to one month, the processor 180 may extract the use history information within one month. In addition, a washing option changed the most among the washing options of the use history information in the extracted period is calculated and the washing option in the latest one month may be given with a weight (e.g., a twofold weight or a threefold weight) and may be used as the input value 910 of the artificial intelligence model 920.

In the training process of the artificial intelligence model 920 according to the present disclosure, the processor may set the use history information of the user as the input value 910 of the artificial intelligence model 920. In addition, the processor 180 may set the second washing option as the result value 930 of the artificial intelligence model 920. At this time, the second washing option may be suitable for the user preference derived via the use history information of the user. The result value 930 may be labeled using the history information of the user and may include the case of receiving the labeled result value from the artificial intelligence server 200.

In addition, unsupervised learning may mean a method of training an artificial neural network in a state in which a label for training data is not given. The artificial intelligence model 920 according to the present disclosure may output the second washing option suitable for the user of the present disclosure as the result value 930, using the use history information as the input value 910 and the second washing option derived from the use history information of other users who use the washing machine in an environment similar to that of the user.

In addition, reinforcement learning may mean a learning method of training an agent defined in a certain environment to select an action or a sequence of actions for maximizing a cumulative reward in each state. The artificial intelligence model according to the present disclosure may be trained such that an agent derives an optimal second washing option according to use history information using reinforcement learning.

Hereinafter, a process of applying use history information used in a previous washing machine when a user replaces a washing machine having an artificial intelligence apparatus mounted therein will be described.

Figure 10:
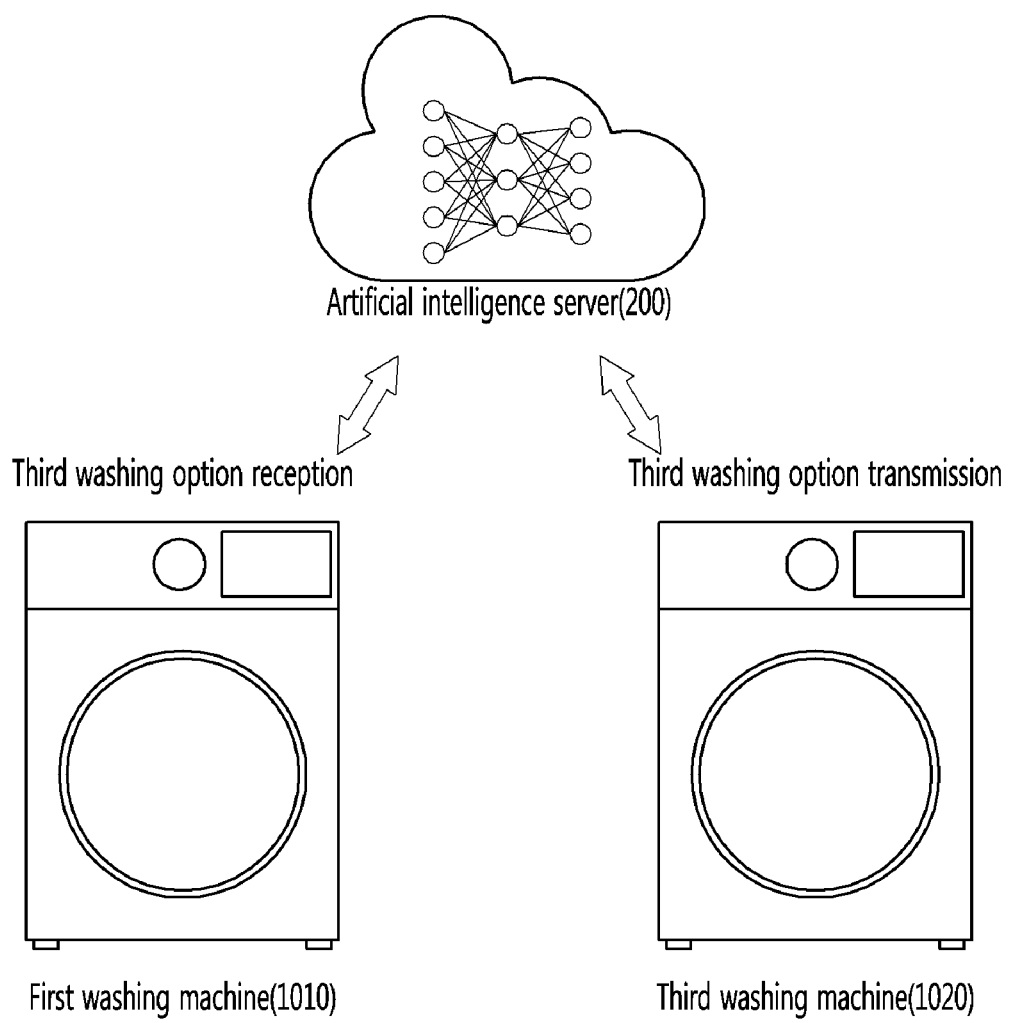
FIG. 10 is a view illustrating a scenario according to the present disclosure.

FIG. 10 is a view illustrating a scenario according to the present disclosure.

Referring to FIG. 10, the artificial intelligence apparatus 100 may include a communication interface 110 communicating with a server 200. In addition, the processor 180 may control the communication interface 110 to transmit, to the server 200, a first washing course reset according to the third washing option of the washing machine which is currently being used.

For example, assume that the "standard washing course" is reset by addition of one-time rinsing which is the third washing option as a result of reflecting the use history of the third washing machine 920 (otherwise known as a secondary washing machine) currently used by the user. The third washing machine may transmit, to the server 200, the reset standard washing course according to the third washing option.

Assume that the user replaces the third washing machine with the first washing machine. According to the present disclosure, the processor 180 may receive the third washing option stored in the server 200 and reset the first washing course of the currently used first washing machine. At this time, the third washing option received from the server may include information on the washing machine reset in the second washing machine according to the use history information in the second washing machine used by the user.

In addition, the processor 180 according to the present disclosure may receive a washing option corresponding to each of a plurality of washing courses from the server 200. The processor 180 may match the washing option corresponding to each of the plurality of washing courses received from the server with the washing course of the currently used first washing machine and reset the washing option included in the plurality of washing courses of the first washing machine according to the washing option corresponding to each of the plurality of washing courses received from the server.

In addition, the processor 180 according to the present disclosure may reset the washing course of the first washing machine, by correcting a detailed difference between the washing option of the third washing machine stored in the server and the washing option of the first washing machine.

According to the present disclosure, the process of correcting the difference in specification between both washing machines may be performed in the server. That is, the third washing option received from the server may be a washing option obtained by correcting the difference in specification between the third washing machine and the first washing machine.

At this time, in relation to the method of correcting the difference in specification between the washing machines, a mapping table in which matching information of the washing course and the washing option is stored for each washing machine type may be used, without being limited thereto.

Second, the processor 180 of the first washing machine may correct the third washing option of the third washing machine received from the server according to the difference in specification between the first washing machine and the third washing machine. After the third washing option is corrected, the processor 180 may reset the washing course, by applying the corrected third washing option to the first washing machine.

In other words, the processor 180 may receive the third washing option from the server, correct the difference in specification between the third washing machine and the first washing machine, acquire the corrected washing option, and reset the first washing course.

At this time, the third washing option received from the server may include information on the washing course reset in the third washing machine according to the use history information in the third washing machine used by the user.

For example, the processor of the third washing machine may control the communication interface of the artificial intelligence apparatus mounted in the third washing machine to transmit, to the server, the third washing option "addition of one-time rinsing in the standard washing course" in the third washing machine 1020 previously used by the user. The processor 180 of the first washing machine 101 may control the communication interface 110 to receive the third washing option from the server.

Specifically, as a result that the user replaces the washing machine, a difference in specification between the first washing machine and the third washing machine may occur according to operation methods and hardware and software differences. In order to compensate for this, the processor 180 of the first washing machine may correct the third washing option of the third washing machine received from the server according to the difference in specification between the first washing machine and the third washing machine.

As a method of correcting the specification, the processor 180 of the first washing machine may store the specification information of the first washing machine and the third washing machine in the memory 170. Alternatively, a mapping table including specification matching information may be stored. The processor 180 may reset the washing course of the first washing machine using the information stored in the memory 170, when the third option of the third washing machine is received.

For example, the processor 180 may acquire a plurality of pieces of washing option information included in the reset standard washing course of the third washing machine. The processor 180 may acquire the washing course and washing option of the first washing machine matching the specification of "addition of one-time rinsing in the standard washing course" of the existing third washing machine from the mapping table stored in the memory.

After the third washing option received from the server is appropriately corrected, the processor 180 may apply the corrected washing option to the first washing machine and reset the washing course.

In addition, according to the present disclosure, before the washing course is reset, it is possible to ask the user whether the first washing option of the predetermined first washing course is reset as the washing option received from the server, similarly to the case the washing course is reset using the use history information.

Thereafter, when user input for operation of the washing machine is received, the processor 180 may control the washing machine to the reset first washing course.

In another example, when the first washing course is reset according to the washing option received from the server, the processor 180 may control the output unit 150 to output a resetting notification. Thereafter, when user input for operation of the washing machine is received, the processor 180 may control the washing machine to perform the reset first washing course.

Hereinafter, an output example of a washing machine having the artificial intelligence apparatus 100 mounted therein will be described.

Figure 11:
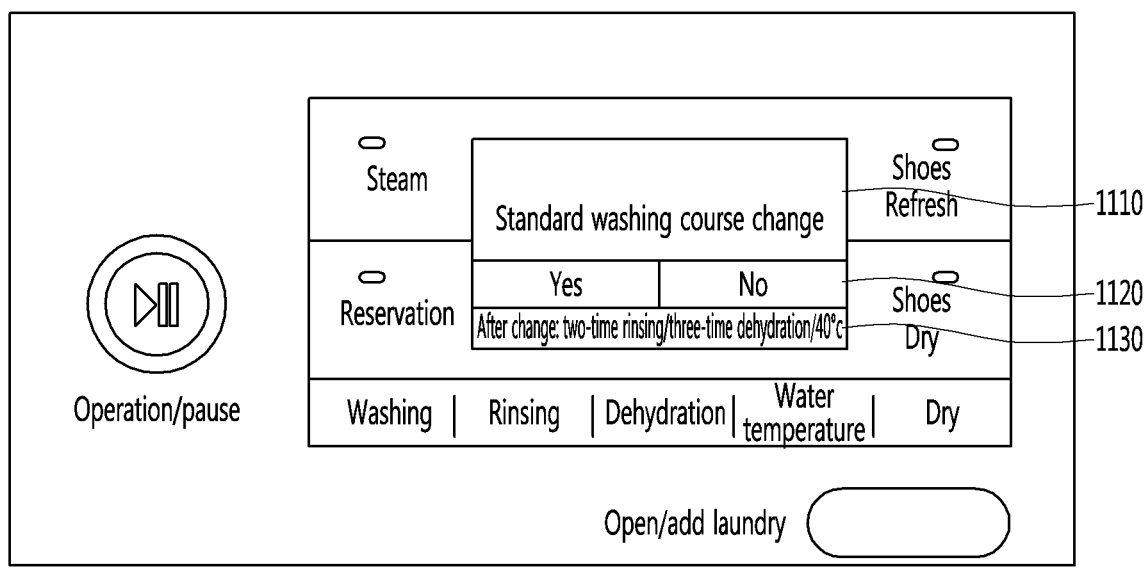
FIG. 11 is a view showing an output example according to the present disclosure.

FIG. 11 is a view showing an output example according to the present disclosure.

According to the present disclosure, the processor 180 may input the collected use history information to the option resetting model, acquire the second washing option output by the option resetting model, and ask the user whether the first washing option of the predetermined first washing course as the second washing option.

Referring to FIG. 11, the processor 180 may control the output interface 150 to output washing course information to be changed 1110, permission of the user 1120, washing option information after change 1130.

For example, assume that one-time dehydration is added in the standard washing course. The processor 180 may display the standard washing course to be changed. In addition, a request for permission of the user may be output. In addition, the output interface 150 may be controlled to output information such as two-time rinsing, three-time dehydration and a water temperature of 40° C. which are the plurality of washing options included in the standard washing courses after change.

Figure 12:
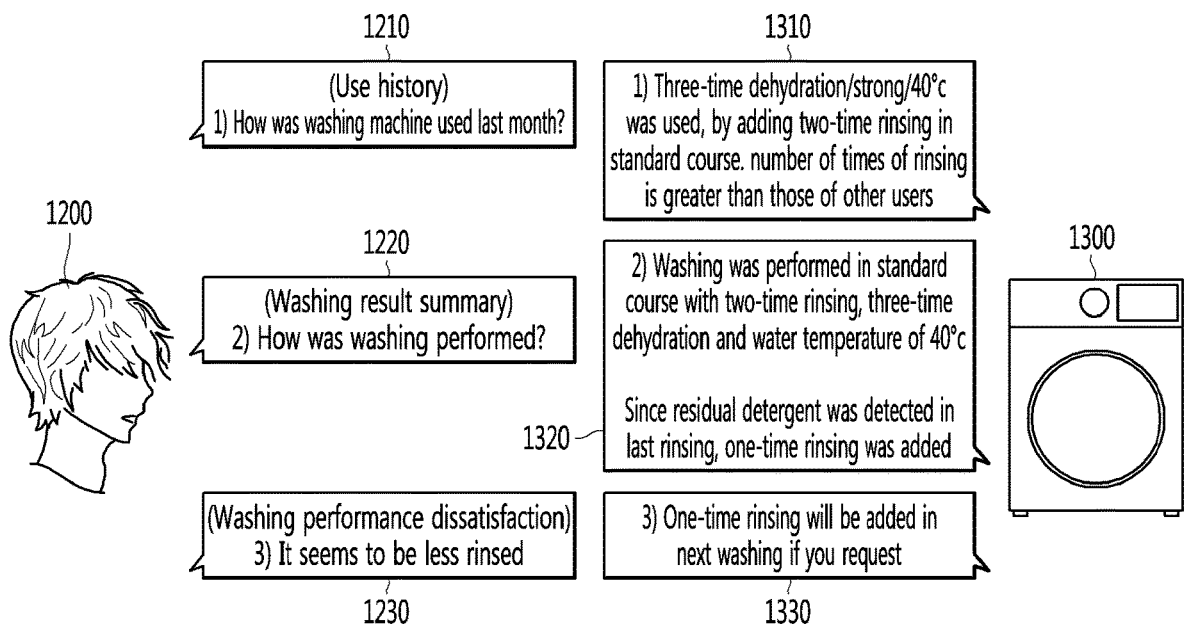
FIG. 12 is a view illustrating a scenario according to the present disclosure.

FIG. 12 is a view illustrating a scenario according to the present disclosure.

Referring to FIG. 12, a scenario using the artificial intelligence device according to the present disclosure and speech recognition is shown.

First, the input interface 120 of the artificial intelligence apparatus 100 according to the present disclosure may receive a speech signal of a user who asks about a use history. For example, when the input interface 120 receives the speech signal "How was the washing machine used last month?" 1210, the processor 180 may provide a response according to the changed washing option of the user from the use history information in which the changed washing option is stored. That is, a notification "Three-time dehydration, a water temperature of 40° C. and three-time rinsing were set by adding two-time rinsing in the standard course" 1310 may be output.

In addition, a result of analyzing and comparing the washing use history of the user with those of the other users may be output as a notification.

Second, the input interface 120 of the artificial intelligence apparatus 100 according to the present disclosure may receive a speech signal asking about a washing result. For example, when the input interface 120 receives a speech signal "How is washing performed?", the processor 180 may output a notification including a washing result "Washing was performed with two-time rinsing, three-time dehydration and a water temperature of 40° C. in the standard washing course" 1320. In addition, when a washing option is added by a smart washing machine differently from user settings, a notification indicating the added washing option may be output.

Third, the input interface 120 of the artificial intelligence apparatus 100 according to the present disclosure may receive a speech signal indicating dissatisfaction with washing performance. For example, when the input interface 120 receives a speech signal "It seems to be less rinsed" 1230, the processor 180 may output a notification "One-time rinsing will be added in next washing if you request" to output a notification for compensating for the insufficient washing result.

The above-described scenario is not limited to the above-described embodiments and FIG. 2 and may include the case where the intention of the user is received by the artificial intelligence apparatus via operation performed in a mobile device and various communications as well as voice.

Hereinafter, the method of operating the artificial intelligence apparatus according to the present disclosure will be described.

According to the present disclosure, a method of operating an artificial intelligence apparatus mounted in a first washing machine includes receiving input of a user, determining whether a first washing option in a first washing course according to the input of the user is changed, inputting use history information reflecting change information of the first washing option to an option resetting model, when the first washing option is changed, and acquiring a second washing option output by the option resetting model and resetting the first washing course according to the second washing option.

At this time, the use history information may include course information and option information, the option information may include at least one of a water temperature, the number of times of rinsing or the number of times of dehydration, and the course information may be information on a combination of the option information according to a washing method.

The option resetting model may give weights to a plurality of washing options in the first washing course included in the use history information and output, as the second washing option, a washing option, in which a sum of the weights is maximum, among the plurality of washing options.

At this time, the more recent a washing option is collected, the higher the weight given to each of the plurality of washing options is.

The option resetting model may extract use history information before a certain period from most recently acquired use history information, give weights to a plurality of washing options in the first washing course included in the extracted use history information, and output, as the second washing option, a washing option, in which a sum of the weights is maximum, among the plurality of washing options.

At this time, the more recent an option is collected, the higher the weight given to each of the plurality of options is.

The method may further include controlling an output interface to output a notification related to whether resetting of the first washing course is allowed and information on the second washing option, before the first washing course is reset, and resetting the first washing course according to the second washing option when the user allows the resetting of the first washing option.

The method may further include controlling the output interface to output a resetting notification when the first washing course is reset according to the second washing option.

The method may further include receiving a third washing option from a server to reset the first washing course. In addition, the third washing option received from the server may include information on a washing course reset in the third washing machine according to use history information of the third washing machine used by the user.

At this time, the third washing option received from the server may be obtained by correcting a difference in specification between the third washing machine and the first washing machine in the server.

The method may further include receiving a third washing option from the server, correcting a difference in specification between a third washing machine and the first washing machine, acquiring a corrected washing option, and resetting the first washing course.

At this time, the third washing option received from the server may include information on a washing course reset in the third washing machine according to use history information of the third washing machine used by the user.

According to the present disclosure, by resetting a washing option of a washing course using user history information reflecting change information of the washing option, it is possible to solve inconvenience that a user needs to manually change the washing option whenever a washing machine is used.

Flowcharts according to the present disclosure may be performed regardless of the order or concurrently. That is, they are not constrained in time-series order.

Other implementations are within the scope of the following claims

The present disclosure can be made in software, firmware or a combination of software and firmware.

According to an embodiment of the present disclosure, the above-described method may be implemented as a processor-readable code in a medium where a program is recorded. Examples of a processor-readable medium may include hard disk drive (HDD), solid state drive (SSD), silicon disk drive (SDD), read-only memory (ROM), random access memory (RAM), CD-ROM, a magnetic tape, a floppy disk, and an optical data storage device.

What is claimed is:

1. A washing machine for setting default washing options of a washing course among a plurality of washing courses using a training method based on artificial intelligence (AI), the washing machine comprising:
   an input interface configured to receive an input from a user; and a processor configured to:
   store the plurality of washing courses and default washing options corresponding to each of the plurality of washing courses, wherein the default washing options comprise at least one of a water temperature, a number of rinse cycles, a spin strength, a dry spin strength, or a number of dehydration cycles,
   determine whether the user changed at least one default washing option of the washing course or whether the user selected the default washing options of the washing course according to the input;
   acquire a use history of the washing course including the changed at least one default washing option or the selected default washing options;
   acquire a result from an AI model using AI, wherein the AI model uses weights given to the changed at least one default washing option or the selected default washing options for each acquired use history among a plurality of acquired use histories for a predetermined period from a most recent acquired use history as an input, wherein a higher weight is given to the changed at least one default washing option or the selected default washing options based on how recently the acquired use history was acquired;
   determine washing options to be reset as default washing options corresponding to the washing course based on the result of the AI model; and
   reset the default washing options to the reset default washing options of the washing course to the determined washing options.

2. The washing machine of claim 1, wherein the processor is further configured to:
   cause an output interface to output a resetting notification related to whether the resetting of the default washing options is allowed, and
   reset the default washing options when an input allowing the resetting of the default washing option is received from the user.

3. The washing machine of claim 1,
   wherein the AI model is configured to: assign the weights given to the changed at least one default washing option or the selected default washing options for each acquired use history, and wherein the result corresponds to a maximum sum of the assigned weights.

4. The washing machine of claim 1, wherein the acquired use history is classified in chronological order.

5. A system including a washing machine for setting default washing options of a washing course among a plurality of washing courses using a training method based on artificial intelligence, the system comprising:
   a first washing machine comprising:
      a wireless interface;
      an input interface configured to receive input from a user; and
      a first processor configured to:
         store the plurality of washing courses and default washing options corresponding to each of the plurality of washing courses, wherein the default washing options comprise at least one of a water temperature, a number of rinse cycles, a spin strength, a dry spin strength, or a number of dehydration cycles,
         determine whether the user changed at least one default washing option of the washing course or whether the user selected the default washing options corresponding to of the washing course according to the input,
         acquire a use history of the washing course including the changed at least one default washing option or the selected default washing options,
         acquire a result from an artificial intelligence (AI) model using AI, wherein the AI model uses weights given to the changed at least one default washing option or the selected default washing options for each acquired use history among a plurality of acquired use histories for a predetermined period from a most recent acquired use history as an input, wherein a higher weight is given to the changed at least one default washing option or the selected default washing options based on how recently the acquired use history was acquired,
         determine washing options to be reset as default washing options corresponding to the washing course based on the result of the AI model; and
         reset the default washing options of the washing course to the determined washing options; and
   a server configured to:
      communicate with the wireless interface of the first washing machine,
      receive the reset default washing options and the washing course corresponding to the reset default washing options from the first processor of the first washing machine,
      store the reset default washing options and the washing course; and
   a second washing machine comprising a second processor, wherein the second processor is configured to:
      acquire the washing course with the reset default washing options from the server;
      determine a second washing course corresponding to the received washing course; and
      reset second default washing options of the second washing course to the reset default washing options.

6. The system of claim 5, wherein the server is configured to compensate for a difference related to washing options between the washing course of the first washing machine and the second washing course of the second washing machine corresponding to the washing course of the first washing machine based on a difference in specification between the first washing machine and the second washing machine.

7. The system of claim 5, wherein the server is configured to store a mapping table in which matching information of the washing course of the first washing machine and the second washing course of the second washing machine corresponding to the washing course of the first washing machine is used.

8. The system of claim 5, wherein the second processor is further configured to compensate for a difference related to washing options between the washing course of the first washing machine and the second washing course of the second washing machine corresponding to the washing course of the first washing machine, wherein the second processor is configured to compensate for the difference using specification information of the first washing machine and the second washing machine stored in a memory or a mapping table including specification matching information stored in the memory.

* * * * *